Figure 1:
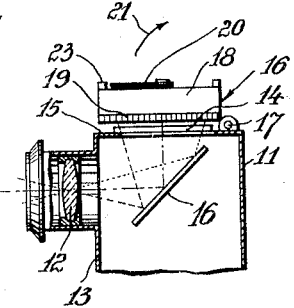

Aug. 24, 1943.    J. BOLSEY    2,327,858

EXPOSUREMETER

Filed Dec. 31, 1940

INVENTOR:
Jacques Bolsey
BY

Patented Aug. 24, 1943

2,327,858

UNITED STATES PATENT OFFICE 2,327,858

EXPOSUREMETER

Jacques Bolsey, New York, N. Y.

Application December 31, 1940, Serial No. 372,505
In Switzerland November 8, 1940

8 Claims. (Cl. 88—23)

My present invention relates to reflex cameras, and more particularly to reflex cameras provided with photo-electric means for regulating the exposure setting of the camera.

More specifically, my invention relates to reflex cameras in which a cell-controlled meter for determining the exposure is attached to the camera.

It is an object of my invention to provide an arrangement which enables measurement of the light intensity of the image in the view finder of such a reflex camera as well as measurement of the intensity of the light rays reaching the camera from the object to be photographed.

It is another object of my invention to provide for these two measurements one single exposure meter, adapted to carry out these measurements intermittently, i. e. one after the other.

It is still another object of my invention to secure this exposure meter to the camera in such a manner as to enable easy and quick shifting of the exposure meter from one measuring position into the other, and convenient reading of the pointer indications on the exposure meter scale in either position.

A further object of my invention consists in shaping and arranging the exposure meter and the camera casing themselves, and their parts, in such a manner as to enable direct adjusting of the factors affecting the exposure in accordance with the indications of the exposure meter.

It is still a further object of my invention to provide a new scale system for the exposure meter arrangements proposed by me.

In order to attain the above objects I propose to provide in a reflex camera a camera casing, a frontal lens in the front wall of said casing, a viewing member in the top wall of said casing, a reflecting mirror within said casing adapted to reflect the light rays entering the casing through said lens onto said viewing member and thus to project an image of the object to be photographed on this member, a photoelectric exposure meter comprising a photoelectric cell and a pointer, and means securing at least said photo-electric cell movably to said camera casing in such a manner as to enable movement of said cell between a position in which its light-sensitive surface faces said viewing member and the image projected on it, and a position in which this surface is directed against the object to be photographed.

In reflex cameras with one single lens only, I use this lens also for focusing purposes by projecting the image of the object to be photographed on the ground glass serving as viewing member; the light intensity of this image is then measured by the exposure meter arrangement described above.

In a preferred embodiment of my invention I use a substantially flat exposure meter comprising an exposure meter body, a photoelectric cell arranged on its bottom wall, and a cooperating pointer arranged on its top wall; this exposure meter is secured by hinge-like means along one of its edges to the top wall of the camera casing adjacent to the rear edge of a rectangular ground glass arranged in this top wall; this arrangement enables positioning of this exposure meter either superposed upon this ground glass with the photoelectric cell facing this glass, or normal to this position with the photoelectric cell facing the object to be photographed and the top wall of the exposure meter with the pointer facing the operator of the camera. It is evident that this arrangement further enables handy and convenient tilting of the exposure meter from one measuring position to the other, and simultaneously easy reading of the pointer indications.

In accordance with my invention, I further combine with the exposure meter, shortly described above, an exposure meter scale being arranged on the top wall of the exposure meter and extending substantially to the front edge of this wall and cooperating with the pointer of the meter; this scale cooperates with the arrangements for adjusting the factors affecting the exposure being arranged on the front wall of said camera casing and extending substantially to said exposure meter edge, thus enabling easy and simple adjusting of these factors in accordance with the indications of the exposure meter pointer.

Figure 2:
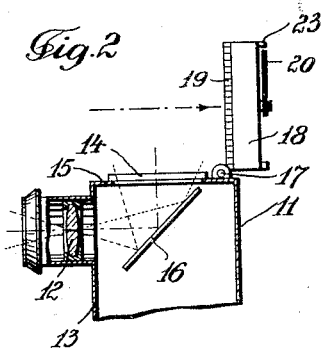
Figure 3:
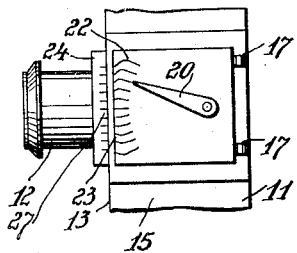
Figure 4:
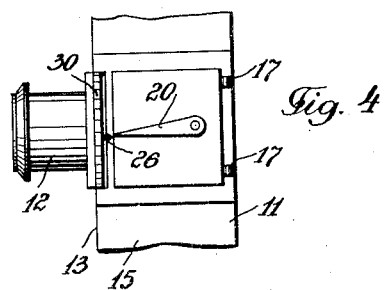
Figure 5:
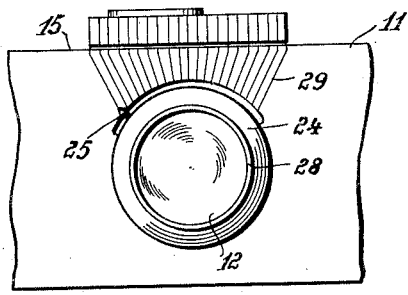

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawing, in which:

Fig. 1 shows a cross-section of a reflex camera equipped with my new exposure meter arrangement, in one position;

Fig. 2 the camera shown in Fig. 1, in another position;

Fig. 3 a top view of the camera shown in Fig. 1;

Fig. 4 a top view of another embodiment of my camera;

Fig. 5 a front view of the camera shown in Figs. 1 and 3; and

Figure 6:
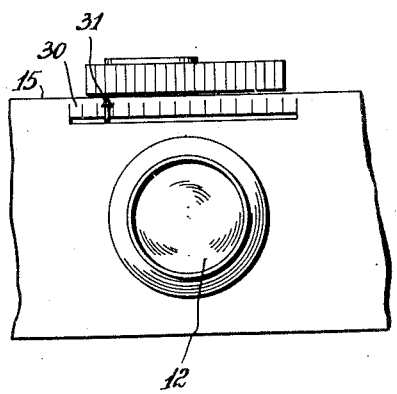

Fig. 6 a front view of another embodiment of my new camera.

As shown in Figs. 1 and 2, the camera comprises a camera casing 11, a camera lens 12 in the front wall 13 of this casing 11, a viewing member including a ground glass 14 in the top wall 15 of this casing, and a reflecting mirror 16 arranged within this casing and adapted to reflect the light rays entering casing 11 through lens 12 onto ground glass 14, forming thereby an image of the object to be photographed on this ground glass.

The above enumerated elements are usually used, well-known elements of many types of reflex cameras, their constructive details and their mode of operation are well-known to everbody skilled in this art and will, therefore, not be described in detail.

In accordance with my present invention, I provide on the top wall 15 of the casing a photoelectric exposure meter 16, secured by hinges 17 thereto. This exposure meter comprises an exposure meter body 18 provided on its bottom face with a light-sensitive cell 19 and on its top face with a pointer 20 cooperating with the light-sensitive cell 19 and indicating the intensity of the light impinging on the outer surface of this cell. I want to note that the light-sensitive cell 19 is preferably composed of a series of small independent, parallelly connected cells.

As shown in Fig. 1, this exposure meter can be tilted into a position in which it is substantially superposed upon ground glass 14 with the photoelectric cell 19 facing this ground glass; in this position each of the small cells is opposite a small portion of the image projected onto the ground glass and thus measures the light intensity of the respective image portion only. As these cells are connected parallelly, they all influence the measurement indicated by pointer 20; they give, however, a more correct indication of the average light intensity of the image than could be achieved by a single cell with a great light-sensitive surface. By tilting the exposure meter around hinges 17 in the direction indicated by arrow 21, it reaches the position shown in Fig. 2, i. e., it is positioned normal to ground glass 14 and top wall 15 facing with the light-sensitive photo-electric cell 19 the object to be photographed, and with its top wall on which the pointer 20 is arranged facing the operator of the camera.

The operation of my new exposure meter is the following:

If I want to measure the light intensity of the image formed on ground glass 14 I tilt the exposure meter into the position shown in Fig. 1; when the exposure meter is to be used for measuring the intensity of the light rays emitted or reflected by the object to be photographed, i. e., if the exposure meter is to be used in the usual way, it is tilted into the position shown in Fig. 2.

As shown in Fig. 3, the top wall of the exposure meter body 16 may be provided with a scale 22 cooperating with pointer 20. It is of importance that, as shown in this figure, this scale extends substantially to the front edge 23 of the exposure meter body 16. As shown in Fig. 5, on the front wall 13 of camera casing 11 are arranged all means for adjusting the factors affecting the exposure, i. e., means for adjusting the diaphragm opening of the camera, means for setting the speed of the camera shutter and means for sliding the camera lens in axial direction.

These means for adjusting the diaphragm opening consist in a rotating ring-shaped member 24 arranged on the front wall 13 coaxially with the lens mount 28. This ring-shaped member may be provided with a pointer, lever, projecting member, or the like, extending near or to the edge 23 of the exposure meter. By means of this projecting member it is possible to set in an easy and simple way the diaphragm opening in accordance with the indications of the exposure meter pointer.

In order to facilitate this operation I may provide an additional scale system 29 on the outer surface of the camera casing, e. g., on its front wall 13 connecting the scale of the exposure meter with the rotating diaphragm adjusting ring 24. (Fig. 5).

I may provide, as furthermore shown, on the adjusting ring 24 a mark 25 cooperating with the scale system 29, further facilitating thereby the setting of the diaphragm.

In another embodiment of my invention I may, as shown in Fig. 4, omit the separate exposure meter scale on the top of the exposure meter body and shape the pointer 26 in such a manner that it reaches to edge 23 of the casing, cooperating directly with scale 29 or the projecting member of the adjusting ring 24.

I want to note that the diaphragm scale 27, shown in Fig. 3, needs not to be arranged on the ring 24; I may also provide the diaphragm scale 30 on the top of the camera casing as shown in Fig. 4, or on the top part of the front wall as shown in Fig. 6, in such a position that it is adjacent to edge 23 of the exposure meter, if the exposure meter is in the position shown in Fig. 1. In this case I have, however, also to provide means, e. g., a gear train, levers, or the like, to transmit the regulating impulses from the adjusting member 31 sliding along this scale.

I may also omit this scale 30 and use this sliding adjusting member 31 only; in this case I have to watch that the point of member 31 be in correspondence with the point of pointer 26.

Instead of using a square-shaped photometer body I may use one with a cylindrical front portion and provide a photometer pointer bent over this edge and sliding with its point along this cylindrical front face of the photometer body. In this case it is especially easy to bring the point of the photometer pointer in correspondence with the diaphragm scale on the camera front wall or with a diaphragm regulating member sliding along the upper edge of this wall.

It will be understood that each of the elements described above, or two or more together, may also find a useful application in other types of reflex cameras differing from the types described above.

While I have illustrated and described the invention as embodied in reflex cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What I claim as new and desire to secure by Letters Patent is:

1. In a reflex camera a camera casing, a frontal lens in the front wall of said casing, a viewing member in the top wall of said casing, a reflecting mirror within said casing adapted to reflect the light rays entering the casing through said lens onto said viewing member and thus to project an image of the object to be photographed on this member, a photo-electric exposuremeter comprising a photo-electric cell and a pointer, and means securing at least said photo-electric cell to the top wall of said camera casing movably between a position in which the light-sensitive surface of said photo-electric cell faces said viewing member and the image projected on it, and a position in which this surface is facing the object to be photographed, said securing means and that part of said camera casing which is located between said securing means and the front edge of said camera casing being arranged and shaped in such a manner that light rays emitted or reflected by the object to be photographed in direction of said camera casing are unobstructedly impinging upon the light-sensitive surface of said photo-electric cell when the same is in a position in which this surface is facing the object to be photographed.

2. In a reflex camera a camera casing, a camera lens in the front wall of said casing, a viewing member comprising a rectangular ground glass arranged on the top of said casing with its edges parallel to the edges thereof, a reflecting mirror within said casing adapted to reflect the light rays entering the casing through the camera lens onto said ground glass and to form thus on the ground glass an image of the object to be photographed, a photo-electric exposuremeter comprising a photo-electric cell and a pointer, and hinge-like means securing at least said photo-electric cell along one of its edges to the top wall of the camera casing adjacent to the rear edge of said rectangular ground glass turnably between a position in which the light-sensitive surface of said photoelectric cell faces said ground glass and the image projected on it and a position in which this surface is facing the object to be photographed, said hinge-like means and that part of the top of said camera casing which is located between said hinge-like means and the upper front edge of said camera casing being arranged and shaped in such a manner that light-rays emitted or reflected by the object to be photographed in direction of said camera casing are unobstructedly impinging upon the light-sensitive surface of said photo-electric cell when the same is in a position in which this surface is facing the object to be photographed.

3. In a reflex camera a camera casing, a camera lens in the front wall of said casing, a viewing member in the top wall of said casing, a reflecting mirror arranged within said casing and adapted to reflect the light rays entering the casing through said camera lens onto said viewing member, and to project thus an image of the object to be photographed on this member, a substantially flat photo-electric exposuremeter comprising an exposuremeter body, a photo-electric cell arranged on its bottom wall, and a cooperating pointer arranged on its top wall, and means securing said exposuremeter movably to said camera casing in such a manner as to enable positioning of said exposuremeter either superposed upon said viewing member with the photo-electric cell facing this member, or normal to this position with the top wall of the exposure meter with the pointer facing the operator of the camera and with the photo-electric cell facing the object to be photographed, said securing means and that part of the camera casing which is located between said securing means and the upper front edge of said camera casing being arranged and shaped in such a manner that light-rays emitted or reflected by the object to be photographed in direction of said camera casing are unobstructedly impinging upon said photo-electric cell when said exposure meter is in a position normal to said viewing member with the photo-electric cell facing the object to be photographed.

4. In a reflex camera a camera casing, a camera lens in the front wall of said casing, a viewing member comprising a rectangular ground glass arranged on the top of said casing with its edges parallel to the edges thereof, a reflecting mirror within said casing adapted to reflect the light rays entering the casing through the camera lens onto said ground glass and to form thus on the ground glass an image of the object to be photographed, a substantially flat photo-electric exposuremeter comprising an exposuremeter body, a photo-electric cell arranged on its bottom wall, and a cooperating pointer arranged on its top wall, and hinge-like means securing said exposuremeter along one of its edges to the top wall of the camera casing adjacent to the rear edge of said rectangular ground glass, enabling thereby positioning of said exposuremeter either superposed upon said ground glass with the photo-electric cell facing this ground glass or normal to this position with the top wall of the exposure meter equipped with the pointer facing the operator of the camera and with the photo-electric cell facing the object to be photographed, said securing means and that part of the top of said camera casing which is located between said hinge-like means and the upper front edge of said camera casing being arranged and shaped in such a manner that light-rays emitted or reflected by the object to be photographed in direction of said camera are unobstructedly impinging upon said photo-electric cell when said exposure meter is in a position normal to said viewing member with said photo-electric cell facing the object to be photographed.

5. In a reflex camera a camera casing, a camera lens in the front wall of said casing, a viewing member in the top wall of said casing, a reflecting mirror arranged within said casing and adapted to reflect the light rays entering the casing through said camera lens onto said viewing member, and to project thus an image of the object to be photographed on this member, a substantially flat photo-electric exposure meter comprising an exposure meter body, a photo-electric cell arranged on its bottom wall, and a cooperating pointer arranged on its top wall, means securing said exposure meter movably to said camera casing in such a manner as to enable positioning of said exposure meter either superposed upon said viewing member with the photo-electric cell facing this member, or normal to this position with the photo-electric cell facing the object to be photographed and the top wall of the exposure meter with the pointer facing the operator of the camera, an exposure meter scale being arranged on the top wall of said exposure meter and extending substantially to the front edge of said wall and cooperating with the exposure meter pointer, and a diaphragm adjusting arrangement being arranged on the front wall of said camera casing and extending substantially to said exposure meter edge, thus enabling easy and simple setting of the diaphragm opening in accordance with the indications of the exposure meter pointer.

6. In a reflex camera a camera casing, a camera lens in the front wall of said casing, a viewing member in the top wall of said casing, a reflecting mirror arranged within said casing and adapted to reflect the light rays entering the casing through said camera lens onto said viewing member, and to project thus an image of the object to be photographed on this member, a substantially flat photo-electric exposure meter comprising an exposure meter body, a photo-electric cell arranegd on its bottom wall, and a cooperating pointer arranged on its top wall, means securing said exposure meter movably to said camera casing in such a manner as to enable positioning of said exposure meter either superposed upon said viewing member with the photo-electric cell facing this member, or normal to this position with the photo-electric cell facing the object to be photographed and the top wall of the exposure meter with the pointer facing the operator of the camera, an exposure meter scale being arranged on the top wall of said exposure meter and extending substantially to the front edge of said wall and cooperating with the exposure meter pointer, and a movable member for adjusting the diaphragm of the camera, said member being arranged on the front wall of said camera casing and extending substantially to said exposure meter edge, thus enabling easy and simple adjusting of these factors in accordance with the indication of the exposure meter pointer.

7. In a reflex camera a camera casing, a camera lens in the front wall of said casing, a viewing member in the top wall of said casing a reflecting mirror arranged within said casing and adapted to reflect the light rays entering the casing through said camera lens onto said viewing member, and to project thus an image of the object to be photographed on this member, a substantially flat photo-electric exposure meter comprising an exposure meter body, a photo-electric cell arranged on its bottom wall, and a cooperating pointer arranged on its top wall, means securing said exposure meter movably to said camera casing in such a manner as to enable positioning of said exposure meter either superposed upon said viewing member with the photo-electric cell facing this member, or normal to this position with the photo-electric cell facing the object to be photographed and the top wall of the exposure meter with the pointer facing the operator of the camera, an exposure meter scale being arranged on the top wall of said exposure meter and extending substantially to the front edge of said wall and cooperating with the exposure meter pointer, a movable member for adjusting the diaphragm of the camera, said member being arranged on the front wall of said camera casing, and a scale system on the outer surface of said camera casing connecting the scale of said exposure meter with said movable diaphragm adjusting member, thus enabling easy and simple adjusting of these factors in accordance with the indication of the exposure meter pointer.

8. In a reflex camera a camera casing, a camera lens in the front wall of said casing, a viewing member comprising a rectangular ground glass arranged on the top of said casing with its edges parallel to the edges thereof, a reflecting mirror within said casing adapted to reflect the light rays entering the casing through the camera lens onto said ground glass and to form thus on the ground glass an image of the object to be photographed, a substantially flat photo-electric exposure meter comprising an exposure meter body, a photo-electric cell composed of a plurality of elements of cells parallelly connected and arranged on the bottom wall of said exposure meter body, and a cooperating pointer arranged on its top wall, and hinge-like means securing said exposure meter along one of its edges to the top wall of the camera casing adjacent to the rear edge of said rectangular ground glass, enabling thereby positioning of said exposure meter either superposed upon said ground glass with the photo-electric cell facing this ground glass or normal to this position with the top wall of the exposure meter equipped with the pointer facing the operator of the camera and with the photo-electric cell facing the object to be photographed, said securing means and that part of the top of said camera casing which is located between said hinge-like means and the upper front edge of said camera casing being arranged and shaped in such a manner that light-rays emitted or reflected by the object to be photographed in direction of said camera are unobstructedly impinging upon said photo-electric cell when said exposure meter is in a position normal to said viewing member with said photoelectric cell facing the object to be photographed.

JACQUES BOLSEY.